(12) United States Patent
Patel

(10) Patent No.: US 11,746,745 B2
(45) Date of Patent: Sep. 5, 2023

(54) SIDEWALL WIND TURBINE SYSTEM WITH PLURALITY OF WIND DIRECTORS

(71) Applicant: Neville Patel, San Diego, CA (US)

(72) Inventor: Neville Patel, San Diego, CA (US)

( * ) Notice: Subject to any disclaimer, the term of this patent is extended or adjusted under 35 U.S.C. 154(b) by 0 days.

(21) Appl. No.: 17/502,940

(22) Filed: Oct. 15, 2021

(65) Prior Publication Data

US 2023/0021639 A1    Jan. 26, 2023

Related U.S. Application Data

(60) Provisional application No. 63/225,215, filed on Jul. 23, 2021.

(51) Int. Cl.
*F03D 3/00* (2006.01)
*F03D 3/04* (2006.01)

(52) U.S. Cl.
CPC ............ *F03D 3/005* (2013.01); *F03D 3/049* (2013.01); *F03D 3/0463* (2013.01); *F05B 2240/211* (2013.01); *Y02E 10/74* (2013.01)

(58) Field of Classification Search
CPC .......... F03D 3/005; F03D 3/0436–049; F03D 3/002; Y02E 10/74
See application file for complete search history.

(56) References Cited

U.S. PATENT DOCUMENTS

| | | | | |
|---|---|---|---|---|
| 698,409 A * | 4/1902 | Neuser | ................... | F03D 3/0454 415/2.1 |
| 6,981,839 B2 * | 1/2006 | Fan | ......................... | F03D 3/002 415/4.1 |
| 7,172,386 B2 * | 2/2007 | Truong | ..................... | F03D 9/35 415/4.1 |
| 10,280,900 B1 * | 5/2019 | Krippene | .............. | F03D 3/0427 |

(Continued)

FOREIGN PATENT DOCUMENTS

| | | | | |
|---|---|---|---|---|
| DE | 19514499 A1 * | 9/1995 | .......... | F03D 3/0463 |
| EP | 2365213 A2 * | 9/2011 | ........... | F03D 3/0463 |

(Continued)

OTHER PUBLICATIONS

Rajpar, Altaf Hussain; Ali, Imran; Eladwi, Ahmad E.; Bashir, Mohamed Bashir Ali. "Recent Development in the Design of Wind Deflectors for Vertical Axis Wind Turbine: A Review". Energies 2021, 14, 5140, MDPI, Aug. 20, 2021.

*Primary Examiner* — Laert Dounis
(74) *Attorney, Agent, or Firm* — CP LAW GROUP PC; Cy Bates

(57) ABSTRACT

Wind turbine systems with wind directors are disclosed. The wind director is configured to simultaneously reduce drag force applied to a returning blade and increase force applied to an advancing blade. In some embodiments, the wind director includes an inlet having an inlet width configured to receive wind at a proximal end, and an outlet having an outlet width on a distal end opposite the proximal end. The wind director is configured to position near a wind turbine such that wind exiting the outlet is applied to an advancing blade of the wind turbine. Furthermore, the wind director provides a barrier to a returning blade opposite the first blade, thereby reducing drag force applied thereto. The wind director may further comprise a secondary duct which has an angled outlet and is configured to apply an additional force to the returning blade.

7 Claims, 11 Drawing Sheets

(56) References Cited

U.S. PATENT DOCUMENTS

| | | | | |
|---|---|---|---|---|
| 2008/0112789 A1* | 5/2008 | Kelaiditis | ................ | F03D 3/04 415/4.1 |
| 2010/0078943 A1* | 4/2010 | Chetwood | ................ | F03D 9/30 290/55 |
| 2010/0219635 A1* | 9/2010 | Evans, Jr. | ............... | F03D 17/00 290/55 |

FOREIGN PATENT DOCUMENTS

| | | | | | |
|---|---|---|---|---|---|
| EP | 3330531 | A1 | * | 6/2018 | |
| FR | 2854931 | A1 | * | 11/2004 | ............... F03D 3/04 |
| JP | 52001251 | A | * | 1/1977 | |
| JP | 2014101756 | A | * | 6/2014 | |
| WO | WO-2009038127 | A1 | * | 3/2009 | ............. F03D 3/002 |
| WO | WO-2009103142 | A1 | * | 8/2009 | ............. F03D 3/002 |
| WO | WO-2010081483 | A1 | * | 7/2010 | ........... F03D 3/0463 |

\* cited by examiner

SIDEWALL WIND TURBINE SYSTEM WITH PLURALITY OF WIND DIRECTORS

CROSS-REFERENCE TO RELATED APPLICATIONS

This application claims benefit of priority with U.S. Provisional Application Ser. No. 63/225,215, filed Jul. 23, 2021; the entire contents of which are hereby incorporated by reference

BACKGROUND

Field of the Invention

This invention relates to wind turbines, and more particularly to a wind director configured to increase efficiency of a vertical-axis wind turbine (VAWT).

Description of the Related Art

A wind turbine is a green energy technology which captures kinetic energy from wind and converts the kinetic energy into electrical energy for use or storage. Generally, there are two kinds of wind turbines: horizontal-axis wind turbine (HAWT) and vertical-axis wind turbine (VAWT).

HAWT are more common in industrial applications due to having a greater efficiency. The HAWT have blades attached to a horizontal rotor which is parallel to a the wind. The HAWT is designed to receive wind upwind or downwind such that each blade receives a roughly equal amount of force. HAWT are bulkier and more expensive to manufacture and maintain. Additionally, HAWT perform worse in dense wind farm configurations due to turbulence caused by neighboring HAWT. As such, HAWT wind farms occupy a greater area than VAWT.

VAWT are more common in residential applications. Blades are attached to a vertical rotor which is perpendicular to the direction of wind. One or more of the blades receive the wind force and rotate each of the blades around the rotor. A VAWT is designed to work in any direction and is therefore better suited for tumultuous winds. A generator and gearbox can be placed near the ground surface which reduces size, complexity, and cost of manufacture and maintenance. Orientation mechanisms are generally not utilized with VAWT due to its omnidirectional design. VAWT also perform much better compared to HAWT in dense wind farms. Recent studies have shown a VAWT wind farm produces more electricity than an equivalent HAWT wind farm occupying the same area. One major disadvantage with conventional VAWT is the lower efficiency compared to HAWT. The lower efficiency of the VAWT is due to several factors including one or more blades receiving a drag force during rotation, which reduces the rotational speed of the wind turbine and subsequently the power output. Power produced by a wind turbine is relative to the cube of the velocity ($P \sim V^3$). Therefore, a reduction in rotational speed by 50% will reduce power output by approximately 88%.

There is an ongoing need to improve the efficiency of vertical-axis wind turbines.

SUMMARY

Various wind turbine systems with wind director are disclosed. The wind director is configured to simultaneously reduce drag force applied to a returning blade and increase force applied to an advancing blade.

In some embodiments, the wind director comprises an inlet having an inlet width configured to receive wind at a proximal end, and an outlet having an outlet width on a distal end opposite the proximal end. The wind director increases speed of the wind passing therethrough due to the outlet width being less than the input width. The wind director is configured to position near a wind turbine such that wind exiting the outlet is applied to a first blade of the wind turbine. Furthermore, the wind director provides a barrier to a second blade opposite the first blade, thereby reducing drag force applied thereto. The wind director may further comprise a secondary duct which has an angled outlet and is configured to apply an additional force to a returning blade.

In some embodiments, the wind director is coupled to an orientation mechanism configured to the realign the wind director into an optimal direction relative to direction of the wind. The orientation mechanism can be an active yaw mechanism, such as a wind sensor and motor, or a passive yaw mechanism, such as a wind vane.

BRIEF DESCRIPTION OF THE DRAWINGS

These and other features of the invention will become apparent to one having the ordinary level of skill in the art upon a thorough review of the following details and descriptions, particularly when reviewed in conjunction with the drawings, wherein.

DETAILED DESCRIPTION OF EMBODIMENTS

Figure 1:
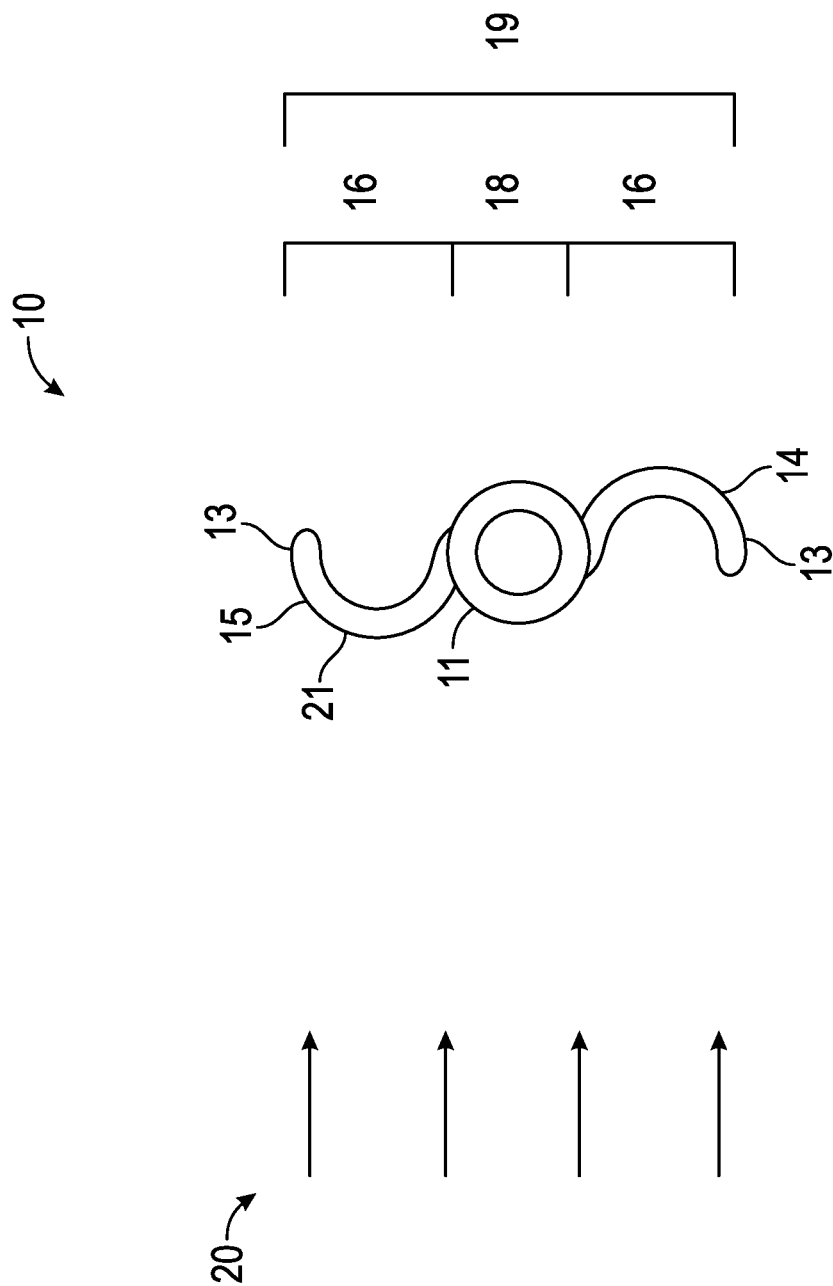
FIG. 1 shows a top view of a conventional vertical-axes wind turbine t.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, reference numbers are provided in the drawings for illustrating certain features of embodiments. Where distinct figures of the drawings utilize a shared reference number, it can be appreciated that the feature corresponding to the shared reference number is the same or similar, perhaps observed from a different view, or observed with respect to a different embodiment deploying the same or similar feature.

For purposes here, the term "vertical-axis wind turbine" means a wind turbine whose rotor is perpendicular to direction of the wind. Vertical-axis wind turbine is also known as VAWT.

The term "advancing blade" means any of a plurality of blades on a wind turbine which is capable of receiving wind force exiting from the outlet of the wind director. At any moment, the advancing blade is the blade providing the greatest, and possibly the only, force to the wind turbine. The advancing blade is not any particular blade on a wind turbine and instead designates position of any blade in the position disclosed herein.

The term "returning blade" means any of a plurality of blades on a wind turbine which is not receiving a wind force from the outlet and additionally may be experiencing a drag force from incoming wind. At any moment, the returning blade is the blade providing zero force or possibly a counteracting force, onto the wind turbine. The returning blade is not any particular blade on a wind turbine and instead designates position of any blade in the position disclosed herein.

The term "blade length" means a length measured from where the blade and rotor couple to a portion of the blade furthest from said rotor.

The term "parallel formation" means two objects side by side and having a relatively same distance continuously between them. Objects which are between +/−10 degrees of each other are considered to be in parallel formation.

General Description of Embodiments

In one embodiment, a wind turbine system is disclosed. The system comprises a vertical-axis wind turbine, a wind director and a secondary duct. The vertical-axis wind turbine includes a rotor perpendicular to a direction of wind and a plurality of blades coupled to the rotor. The plurality of blades includes an advancing blade and a returning blade. Each of the plurality of blades comprises a blade length and blade height. The wind director comprises a proximal end and a distal end opposite the proximal end. A hollow interior is formed by a top portion, a bottom portion, a first side, and a slanted portion. An inlet is disposed at the proximal end where the inlet has an inlet width and an inlet height. An outlet is disposed at the distal end, and the outlet having an outlet width and an outlet height. The secondary duct is coupled to the wind director and comprises a duct length extending along the first side. The secondary duct further comprises an angled outlet disposed at a terminal end of the duct length. The wind turbine system is configured to receive and direct wind into the advancing blade and is further configured to receive and direct wind into the returning blade.

Generally, the inlet width may be greater than the outlet width. In some embodiments, the inlet width is more than twice the outlet width due to the inlet width comprising an amount which covers two opposing blades extending from opposite sides of the rotor while the outlet width comprises an amount of a single blade.

In some embodiments the inlet height may be equal to or greater than the outlet height.

In some embodiments, the vertical-axis wind turbine may further comprise a rotation diameter, and wherein the inlet width is equal to or greater than the rotation diameter.

In some embodiments, the duct length may be greater than the first side.

In some embodiments, the angled outlet may comprise a duct angle. The duct angle may comprise between and inclusive of ninety and two hundred and twenty-five degrees.

In some embodiments, the outlet width may be less than or equal to the blade length.

In some embodiments, the outlet height may be less than or equal to the blade height.

In some embodiments, the wind director may further comprise a catcher disposed within the hollow interior, the catcher having a plurality of apertures configured to allow wind to pass therethrough.

In some embodiments, the system may further comprise an orientation mechanism configured to change position of the wind director to accommodate changes in the direction of the wind.

In some embodiments, the wind director may be coupled to the vertical-axis wind turbine by a support structure.

In some embodiments, the system may further comprise a barrier disposed between the hollow interior and the secondary duct such that both the hollow interior and secondary duct comprise distinct volumes.

In some embodiments, the wind director may further comprise a second side disposed between the inlet and the slanted portion.

In a second embodiment, a wind director is disclosed. The wind director comprises a proximal end, a distal end opposite the proximal end, and a hollow interior formed by a top portion, a bottom portion, a first side, and a slanted portion. The wind director further comprises an inlet disposed at the proximal end, the inlet having an inlet width and an inlet height, and an outlet disposed at the distal end, the outlet having an outlet width and an outlet height. A secondary duct is coupled to the wind director, the secondary duct comprising a duct length extending along the first side. The secondary duct further comprising an angled outlet disposed at a terminal end of the duct length. The wind director is configured to receive and direct wind into the advancing blade and is further configured to reduce drag force applied to the returning blade.

Generally, the inlet width may be greater than the outlet width.

In some embodiments the inlet height may be equal to or greater than the outlet height.

In some embodiments, the vertical-axis wind turbine may further comprise a rotation diameter, and wherein the inlet width is equal to or greater than the rotation diameter.

In some embodiments, the duct length may be greater than the first side.

In some embodiments, the angled outlet may comprise a duct angle. The duct angle may comprise between and inclusive of ninety and two hundred and twenty-five degrees.

In some embodiments, the wind director may further comprise a catcher disposed within the hollow interior, the catcher having a plurality of apertures configured to allow wind to pass therethrough.

In some embodiments, the system may further comprise an orientation mechanism configured to change position of the wind director to accommodate changes in the direction of the wind.

In some embodiments, the system may further comprise a barrier disposed between the hollow interior and the secondary duct such that both the hollow interior and secondary duct comprise distinct volumes.

In some embodiments, the wind director may further comprise a second side disposed between the inlet and the slanted portion.

In a third embodiment, a wind turbine system is disclosed. The wind turbine system comprises a vertical-axis wind turbine having a rotor perpendicular to a direction of wind and a plurality of blades coupled to the rotor, the plurality of blades including an advancing blade and a returning blade, and where each of the plurality of blades comprises a blade length and blade height. The system further comprises a wind director comprising a proximal end, a distal end opposite the proximal end, and a hollow interior formed by a top portion, a bottom portion, a first side, and a slanted portion. An inlet is disposed at the proximal end, the inlet having an inlet width and an inlet height, and an outlet is disposed at the distal end, the outlet having an outlet width and an outlet height. The wind director is configured to receive and direct wind into the advancing blade and is further configured to reduce drag force applied to the returning blade.

In some embodiments, the wind director may further comprise a secondary duct coupled to the wind director, the secondary duct having a duct length extending along the first side, the secondary duct further comprising an angled outlet disposed at a terminal end of the duct length.

Generally, the inlet width may be greater than the outlet width. In some embodiments, the inlet width is more than twice the outlet width due to the inlet width comprising an amount which covers two blades extending from opposite sides of the rotor while the outlet width comprises an amount of a single blade.

In some embodiments the inlet height may be equal to or greater than the outlet height.

In some embodiments, the vertical-axis wind turbine may further comprise a rotation diameter, and wherein the inlet width is equal to or greater than the rotation diameter.

In some embodiments, the duct length may be greater than the first side.

In some embodiments, the angled outlet may comprise a duct angle. The duct angle may comprise between and inclusive of ninety and two hundred and twenty-five degrees.

In some embodiments, the outlet width may be less than or equal to the blade length.

In some embodiments, the outlet height may be less than or equal to the blade height.

In some embodiments, the wind director may further comprise a catcher disposed within the hollow interior, the catcher having a plurality of apertures configured to allow wind to pass therethrough.

In some embodiments, the system may further comprise an orientation mechanism configured to change position of the wind director to accommodate changes in the direction of the wind.

In some embodiments, the wind director may be coupled to the vertical-axis wind turbine by a support structure.

In some embodiments, the system may further comprise a barrier disposed between the hollow interior and the secondary duct such that both the hollow interior and secondary duct comprise distinct volumes.

In some embodiments, the wind director may further comprise a second side disposed between the inlet and the slanted portion.

In some embodiments, the wind director may further comprise a wind shadow blocker coupled to the slanted portion.

In a fourth embodiment, a wind turbine system is disclosed. The wind turbine system comprises a rotor perpendicular to a direction of wind, a plurality of blades including an advancing blade and a returning blade each coupled to the rotor, a generator coupled to the rotor, and one or more mounts coupled to the rotor and further coupled to a first mounting surface. The rotor and the first mounting surface are in a parallel formation.

In some embodiments, the system may further comprise an orientation mechanism configured to change position of the rotor, a wind sensor configured to determine a direction of wind, and a control module electrically coupled to both the wind sensor and orientation mechanism. The control module is configured to receive data from the wind sensor and send instructions to the orientation mechanism.

In some embodiments, the system may further comprise a first wind director coupled to the first mounting surface, the first wind director comprising a first slanted portion having a first end, a second end opposite the first end, and a support element coupled to the second end and further coupled to the first mounting surface. A first angle is formed by the first end of the first slanted portion and the first mounting surface. The first wind director is configured to block wind from the returning blade and direct wind toward the advancing blade. The first angle may comprise between and inclusive of thirty and sixty degrees. Other angles may also be utilized.

In some embodiments, the system may further comprise a second wind director coupled to a second mounting surface, the second mounting surface being in a parallel formation with the first mounting surface. The second wind director comprises a second slanted portion with a third end, a fourth end opposite the third end, and a support element coupled to the fourth end and further coupled to the second mounting surface A second angle is formed by the third end of the second slanted portion and the second mounting surface. The second wind director is configured to direct wind toward the advancing. blade. The second angle may comprise and angle between and inclusive of thirty and sixty degrees. Other angles may be utilized.

In some embodiments, the first and second slanted portion may comprise a collinear alignment.

Illustrated Embodiments

Now turning to the drawings, FIG. 1 shows a top view of a conventional wind turbine (10) according to an embodiment. The wind turbine, more specifically a vertical-axis wind turbine (VAWT), comprises a rotor (11) extending upward from a ground surface, and a plurality of blades (13) each coupled to the rotor and each configured to receive force from wind (20) to rotate the rotor. An advancing blade (14) is positioned and shaped to receive wind which is greater than a drag force (21) experienced by a returning blade (15) opposite the first blade. Overall, a net force is applied to the wind turbine which is configured to rotate in a counter-clockwise direction as shown. However, efficiency is reduced due to the opposing force from the drag force.

The wind turbine (10) is shown comprising two blades, namely the advancing blade (14) and the returning blade (15) opposite the first blade. It will be appreciated by one having skill in the art that the wind turbine may comprise more than two blades, such as three, four or any number of blades that a VAWT is capable of comprising.

The wind turbine (10) comprises a rotation diameter (19) which comprises a rotor diameter (18) and blade lengths (16) of two opposing blades.

Figure 2:
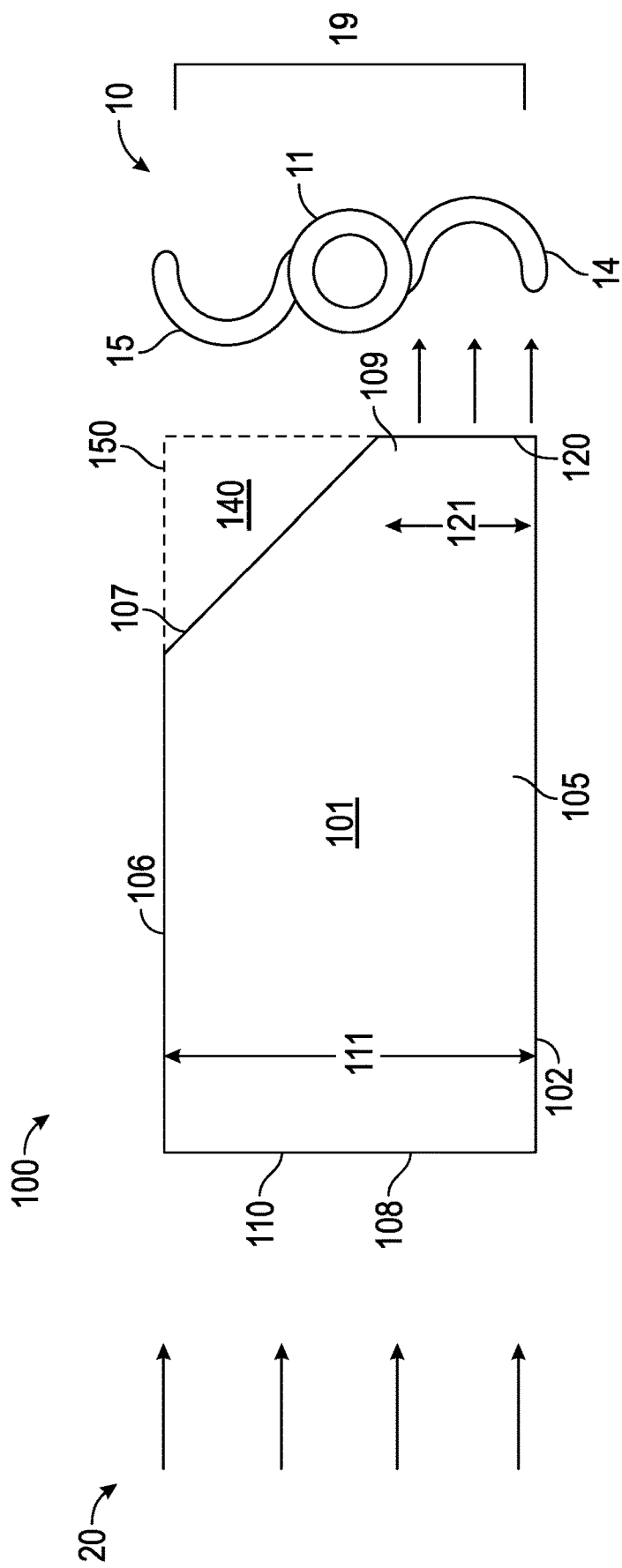
FIG. 2 shows a top view of a wind turbine system with wind director in accordance with a first illustrated embodiment.

FIG. 2 shows a top view of a wind director (100) in accordance with a first illustrated embodiment. The wind director comprises a top portion (101) and a bottom portion (not shown) opposite the top portion. A first side (105), which is generally planar in shape, extends from the top portion to the bottom portion. Additionally, a second side (106) is disposed opposite the first side and additionally extends from the top portion to the bottom portion. A slanted portion (107) is coupled to the second side, the top portion, and the bottom portion. Disposed at a proximal end (108) is an inlet (110) configured to receive wind (20), the inlet having an inlet width (111) associated therewith. The inlet is formed by the top portion, the bottom portion, the first side, and the second side and generally comprises a rectangular shape. Disposed at a distal end (109) is an outlet (120) having an outlet width (121) associated therewith. Due to the slanted portion, the outlet width is less than the inlet width, such that kinetic energy from wind is concentrated within the wind director. Said concentration creates a greater wind velocity, and consequently greater kinetic energy, at the outlet relative to wind which initially entered the wind director at the inlet. The outlet is formed by the top portion, the bottom portion, the first side, and the slanted portion. Collectively, the top portion, bottom portion, first side, second side, and slanted portion form a hollow interior for collecting and directing wind to a desirable location and away from an undesirable one.

The wind director (100) is positioned near a wind turbine (10) such that the outlet (120) is close enough to an advancing blade (14) to maximize wind velocity applied thereto, while also being far enough to prevent contact with the wind turbine. Furthermore, the wind director is positioned such that the second side (106) and the slant portion (107) create a wind shadow (140) where little to no wind is present. The wind shadow greatly reduces a drag force that would be applied to a returning blade (16). The wind director therefore maximizes the wind turbine efficiency by simultaneously increasing a force applied to the advancing blade while decreasing drag force applied to the returning blade.

The inlet width (111), and generally a width of the wind director (100) itself comprises a length sufficient to the rotation diameter (19). Preferably, the inlet width is equal to or greater than the rotation diameter.

The wind director (10) may further comprise a wind shadow blocker (150) coupled to the slanted portion (107), thereby forming a rectangular shape at a top periphery (102) at an exterior while the hollow interior remains slanted for purposes of concentrating wind energy. The wind shadow blocker further minimizes wind energy that may contact the returning blade (15) by preventing airflow from bending around the slanted and into the wind shadow (140).

As shown, the slanted portion (107) is shown near a midpoint of the second side (106), thereby creating an angle approximately 45 degrees. Other angles and locations of the slant relative to the second edge my alternatively be implemented which can be appreciated by one having skill in the art. In some embodiments, the first side (105) may additionally comprise a second slanted portion.

Figure 3:
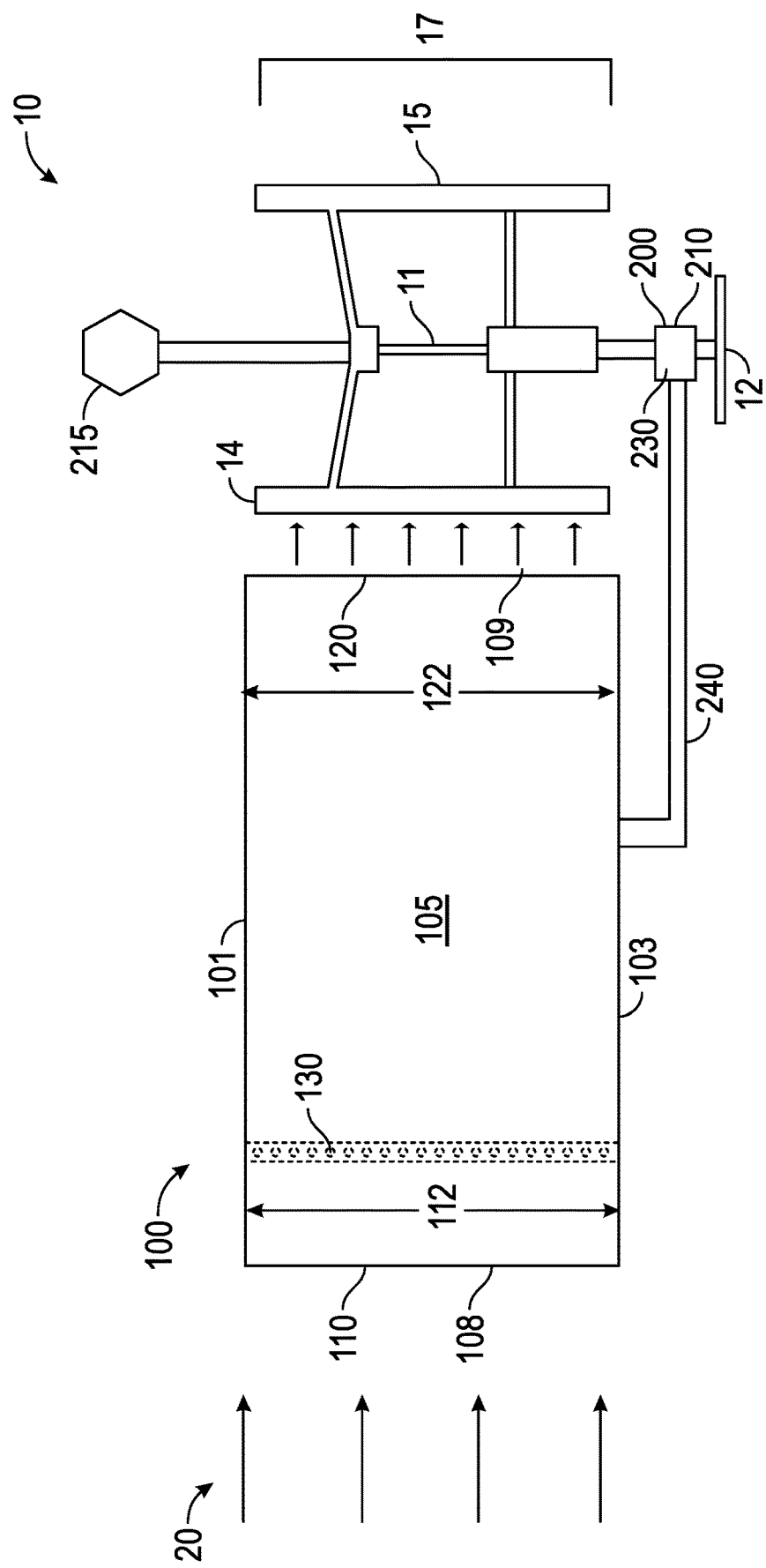
FIG. 3 shows a side view of a wind turbine system with wind director in accordance with a second illustrated embodiment.

FIG. 3 shows a side view of a wind director (100) according to a second illustrated embodiment; The wind director comprises a top portion (101), a bottom portion (103), and a first side (105) extending therebetween. A second side (not shown), additionally extends from the top side to the bottom side, thereby forming a hollow interior or frame that has openings at a proximal end (108) and a distal end (109). At the proximal end is an inlet (110) configured to receive and funnel wind passing therethrough, and at the distal end is an outlet (120) configured to release wind to a wind turbine (10) disposed nearby. The wind director may optionally comprise a catcher (130) disposed within the wind director and is generally orthogonal to the first side. The catcher comprises a plurality of apertures configured to prevent larger objects, such as birds, from further translation out of the outlet and into the wind turbine.

Blades of the wind turbine (10) each comprise a blade height (17). In a preferable embodiment, an outlet height (122) is equal to or less than the blade height of an advancing blade (14) to ensure most wind exiting the outlet (120) makes contact with the advancing blade. In some embodiments, the outlet height is equal to an inlet height (112).

The wind director (100) is coupled to the wind turbine (10) at a tower base (12) via a coupler (230). Due to ever changing direction of wind, the wind director is configured to rotate around the wind turbine for purposes of realigning with a direction of wind (20). An orientation mechanism (200) is utilized, and more specifically an active yaw mechanism (210) configured to measure the direction of the wind and apply a force from a motor to the wind director and/or coupler for the purpose of realignment. A wind sensor (215) can be positioned on or above the tower, and is configured to sense wind direction and send a signal to a processor (not shown) which can calculate when and where to realign the wind director. In other embodiments, the active yaw mechanism is configured to additionally rotate the tower such the both the wind turbine and the wind director move together. Power applied to the yaw mechanism may originate from output of the wind turbine or an external source.

The wind director (100) couples to the wind turbine (10) by one or more support structures (240). One having skill in the art will appreciate there are a myriad of support structure configurations used for coupling the wind director to the wind turbine. In alternative embodiments, the wind director is not coupled to the wind turbine and instead is coupled to a track which surrounds the wind turbine and allows the wind director to rotate accordingly.

Figure 4:
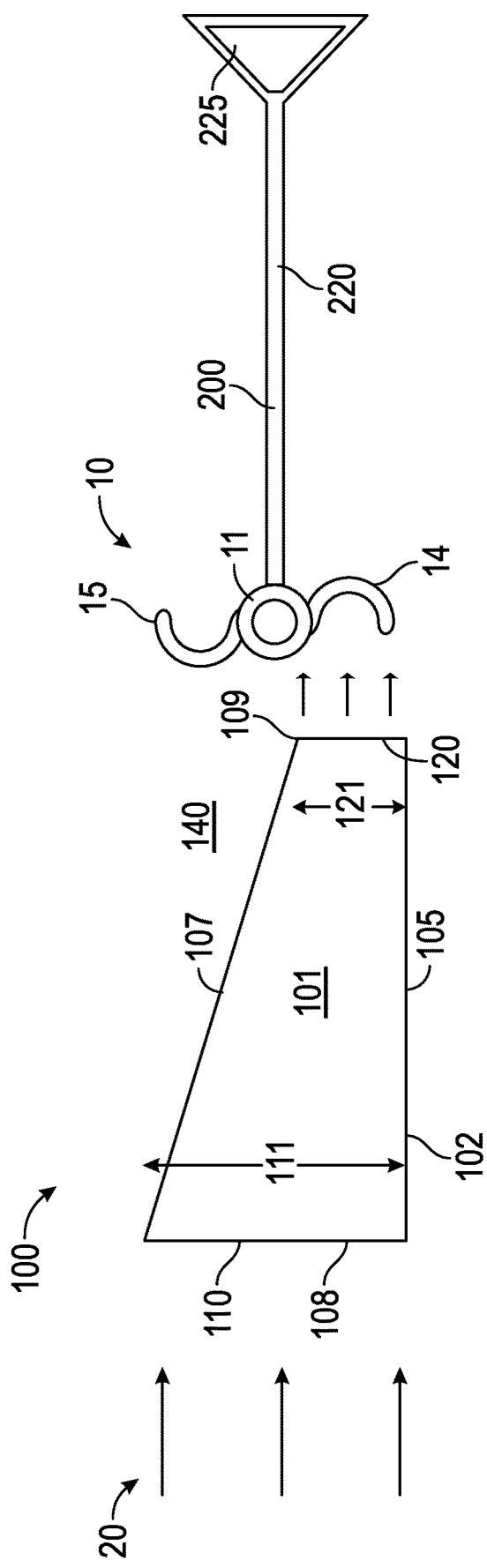
FIG. 4 shows a top view of a wind turbine system with wind director in accordance with a third illustrated embodiment.

FIG. 4 shows a top view of a wind director (100) in accordance with a third illustrated embodiment. The wind director comprises a top portion (101) and a bottom portion (not shown) opposite the top portion. A first side (105), which is generally planar in shape, extends from the top portion to the bottom portion. Additionally, a slanted portion (107) is disposed opposite the first side and additionally extends from the top portion to the bottom portion. Disposed at a proximal end (108) is an inlet (110) configured to receive wind (20), the inlet having an inlet width (111) associated therewith. The inlet is formed by the top portion, the bottom portion, the first side, and the slanted portion and generally comprises a rectangular shape. Disposed at a distal end (109) is an outlet (120) having an outlet width (121) associated therewith. Due to the slanted portion, the outlet width is less than the inlet width. such that kinetic energy from wind is concentrated within the wind director. The outlet is formed by the top portion, the bottom portion, the first side, and the slanted portion. Collectively, the top portion, bottom portion, first side, and slanted portion form a hollow interior for collecting and directing wind to a desirable location and away from an undesirable one.

The wind director (100) further comprises a passive yaw mechanism (220) comprising a wind vane (225). The wind vane is coupled to a wind turbine (10) opposite the wind director. The wind vane is configured to receive a wind force and apply a corresponding rotational force to the wind turbine and/or wind director, thereby realigning the wind director without use of a motor or other external forces.

The wind vane (225) generally comprises an area greater than an area of the first side (106) overcome a counteracting force applied by an offset wind. The wind vane should be sufficient in size to overcome not only the counteracting force but also be enough to apply a sufficient rotational force to rotate the wind turbine (10) and/or wind director (100). In some embodiments, the first side may comprise apertures or vents to reduce the counteracting force applied by the offset wind. The slanted portion (107) is devoid of any apertures or holes so as to prevent wind entering the wind shadow and dragging the second blade.

Figure 5:
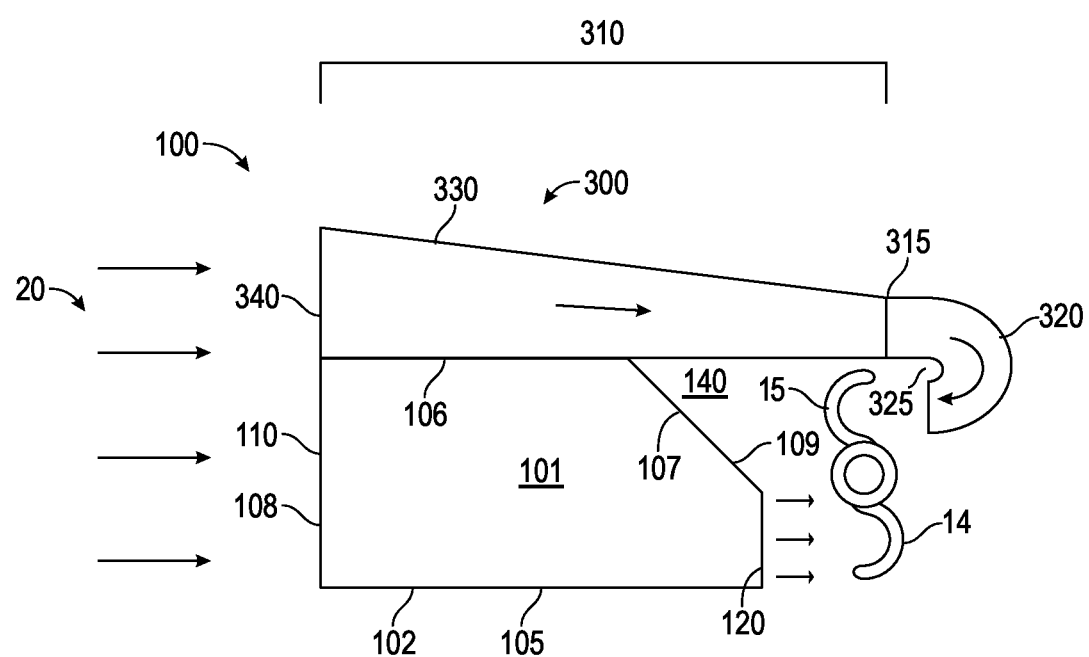
FIG. 5 shows a top view of a wind turbine system with wind director in accordance with a fourth illustrated embodiment.

FIG. 5 show a top view of a wind turbine (10) system with wind director (100) according to a fourth illustrated embodiment. The wind director comprises a hollow interior formed by a top portion (101), a bottom portion (not shown), a first side (105), a second side (106) and a slanted portion (107). The wind director further comprises an inlet (110) disposed at a proximal end (108) and an outlet (120) disposed at a distal end (109). Coupled to the wind director at the second side is a secondary duct (300). The secondary duct comprises a duct length (310) which extends along the second side. Coupled at a terminal end (315) of the duct length is an angled outlet (320). The angled outlet comprises a duct angle (325). Preferably, the duct angle comprises an angle between an inclusive of ninety degrees and two hundred and twenty-five degrees, such that wind (20) entering the secondary duct is redirected and applied to a returning blade (15). In such a configuration, wind enters both the secondary duct and wind director. Wind passing through the wind director is concentrated and directed to an advancing blade (14), and wind passing through the secondary duct is directed to the returning blade. In some embodiments, wind passing through the secondary duct is concentrated due to the presence of a duct slant (330) which concentrates wind similar to the slanted portion of the wind director.

As shown, the second side (106) acts as a barrier between the wind director (100) and secondary duct (300) such that both the wind director and secondary duct comprise distinct volumes and further comprise distinct inlets, namely inlet (110) for the wind director and a duct inlet (340) for the secondary duct. In alternative embodiments, the second side is not present, making the secondary duct no longer segregated from the wind director. In such alternative embodiments, a single inlet receives wind for both the wind director and the secondary duct.

The angled outlet (320) is shown having a smooth curvature to mitigate turbulence. Other means of providing curvature to the angled outlet can also be utilized as can be appreciated by one having skill in the art.

Figure 6:
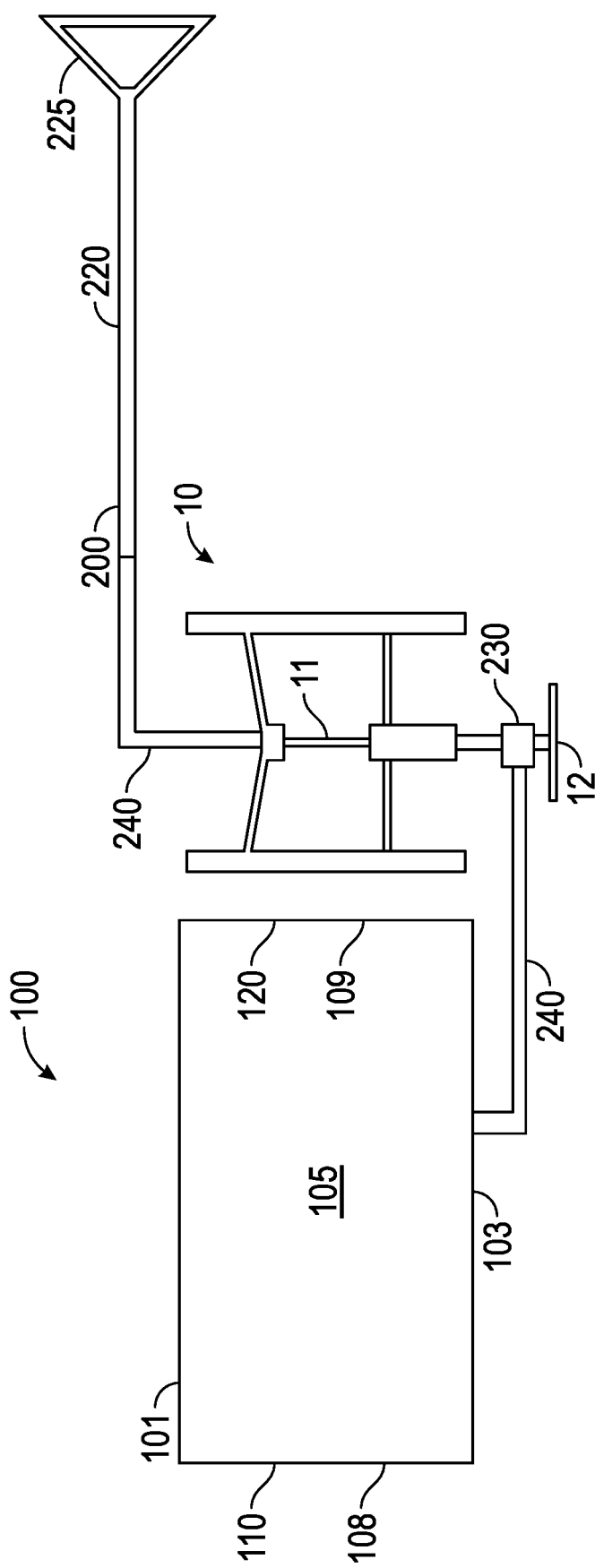
FIG. 6 shows a side view a wind turbine system with wind director in accordance with a fifth illustrated embodiment.

FIG. 6 shows a side view of a wind turbine (10) system with a wind director (100) according to a fifth illustrated embodiment. The wind director is fixedly coupled to a wind turbine (10) near a tower base (12). A wind vane (225) is coupled to a top portion of the wind turbine via one or more support structures (240). As shown, the wind vane receives air passing above the wind turbine, which causes the wind vane, and subsequently the wind turbine and wind director to move together. An advantage of this embodiment includes the wind vane receiving a greater wind force due to wind traveling faster at higher altitudes.

Figure 7:
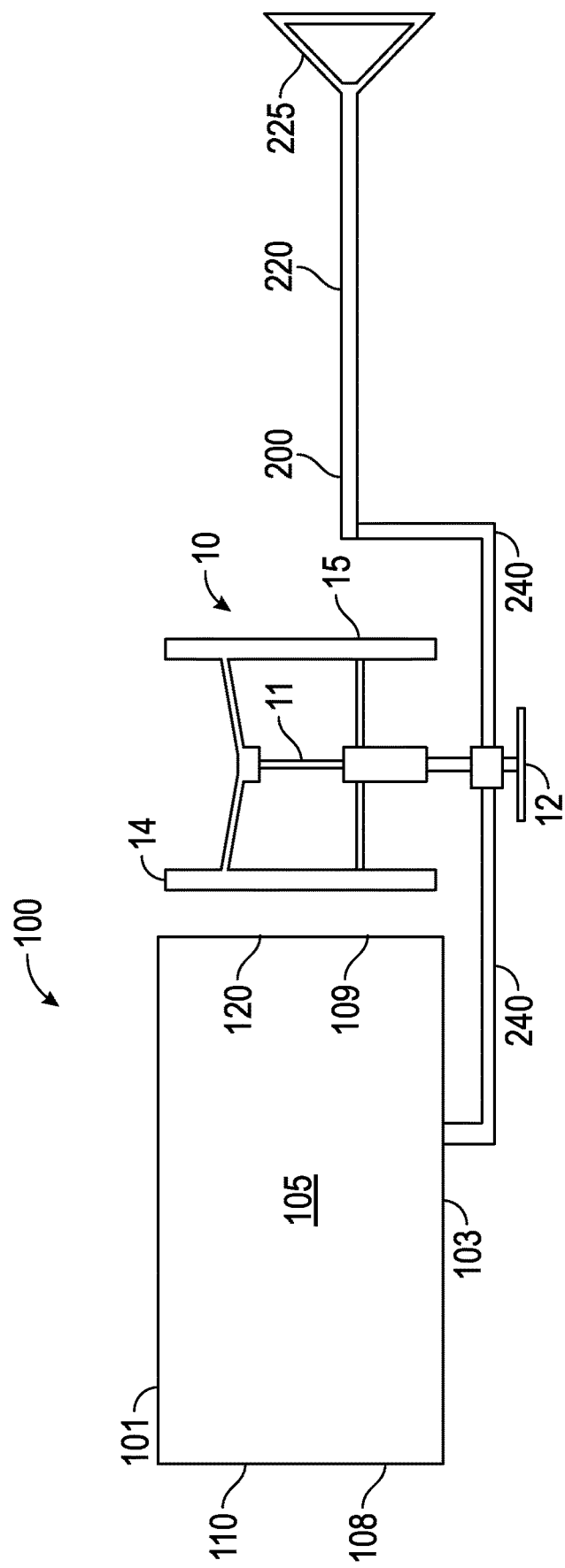
FIG. 7 shows a side view of a wind turbine system with wind director in accordance with a sixth illustrated embodiment.

FIG. 7 shows a side view of a wind turbine (10) system with a wind director (100) in accordance with a sixth illustrated embodiment. In this embodiment, a wind vane (225) and the wind director are coupled together by a coupler (230) disposed at a tower base (12). The coupler is rotatably attached such that the coupler is configured to rotate about the wind turbine upon receiving a rotational force. The rotational force generally originates from the wind vane used to reposition the wind director into alignment with a wind direction. An advantage of this embodiment includes retrofitting the wind vane and wind director onto existing wind turbines, which can remain stationary as originally designed.

Figure 8:
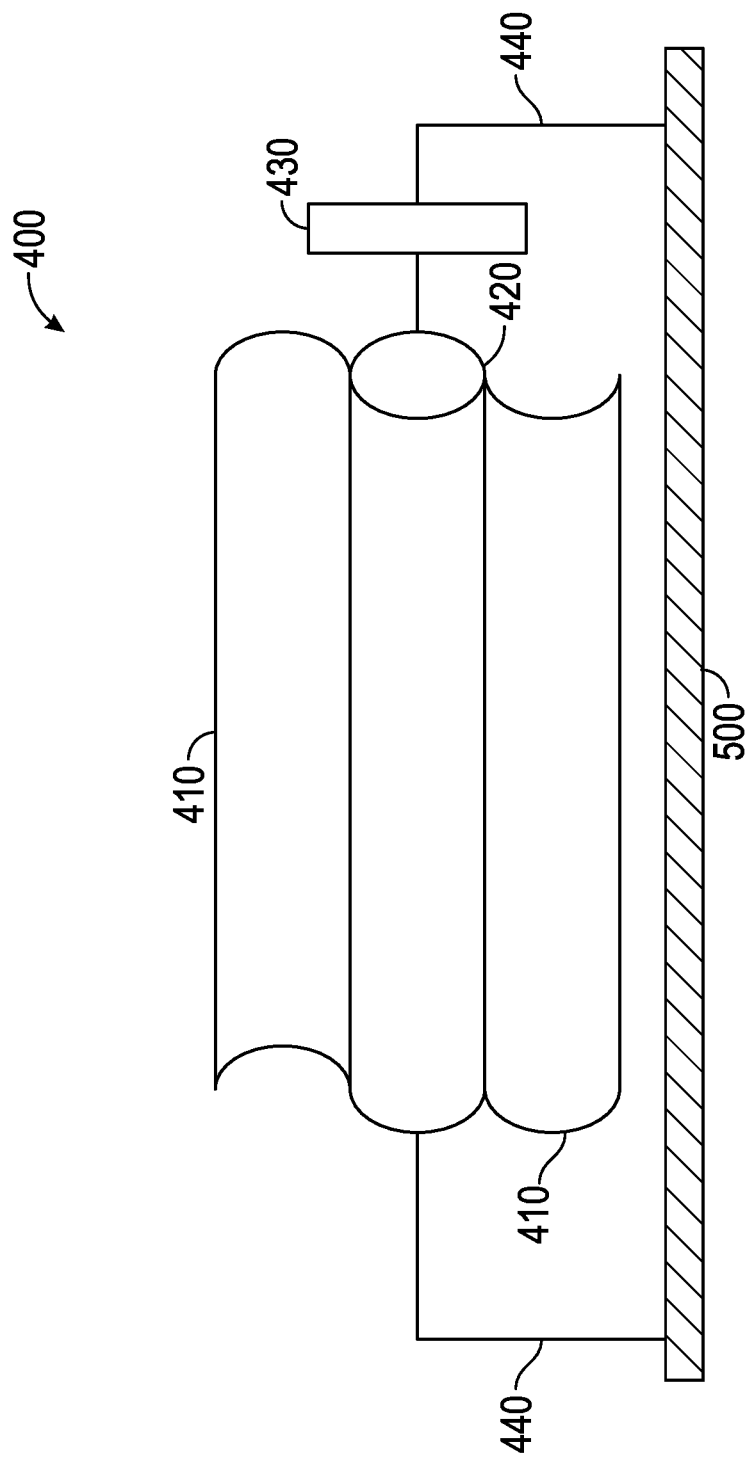
FIG. 8 shows a perspective view of a vertical-axis wind turbine.

FIG. 8 shows a perspective view of a vertical-axis wind turbine (400). The vertical-axis wind turbine (VAWT) comprises a plurality of blades (410) coupled to a rotor (420), the rotor being configured to rotate when one or more of the plurality of blades receives a wind force. The rotation causes a generator (430) to generate electricity for present use or storage. The VAWT is coupled to a mounting surface (500) by one or more mounts (440). Alternatively, the generator may be disposed near the mounting surface and coupled to the rotor (420) via an angled-shaft configured for rotation. The rotor and the mounting surface are characterized as being in a parallel formation.

Figure 9:
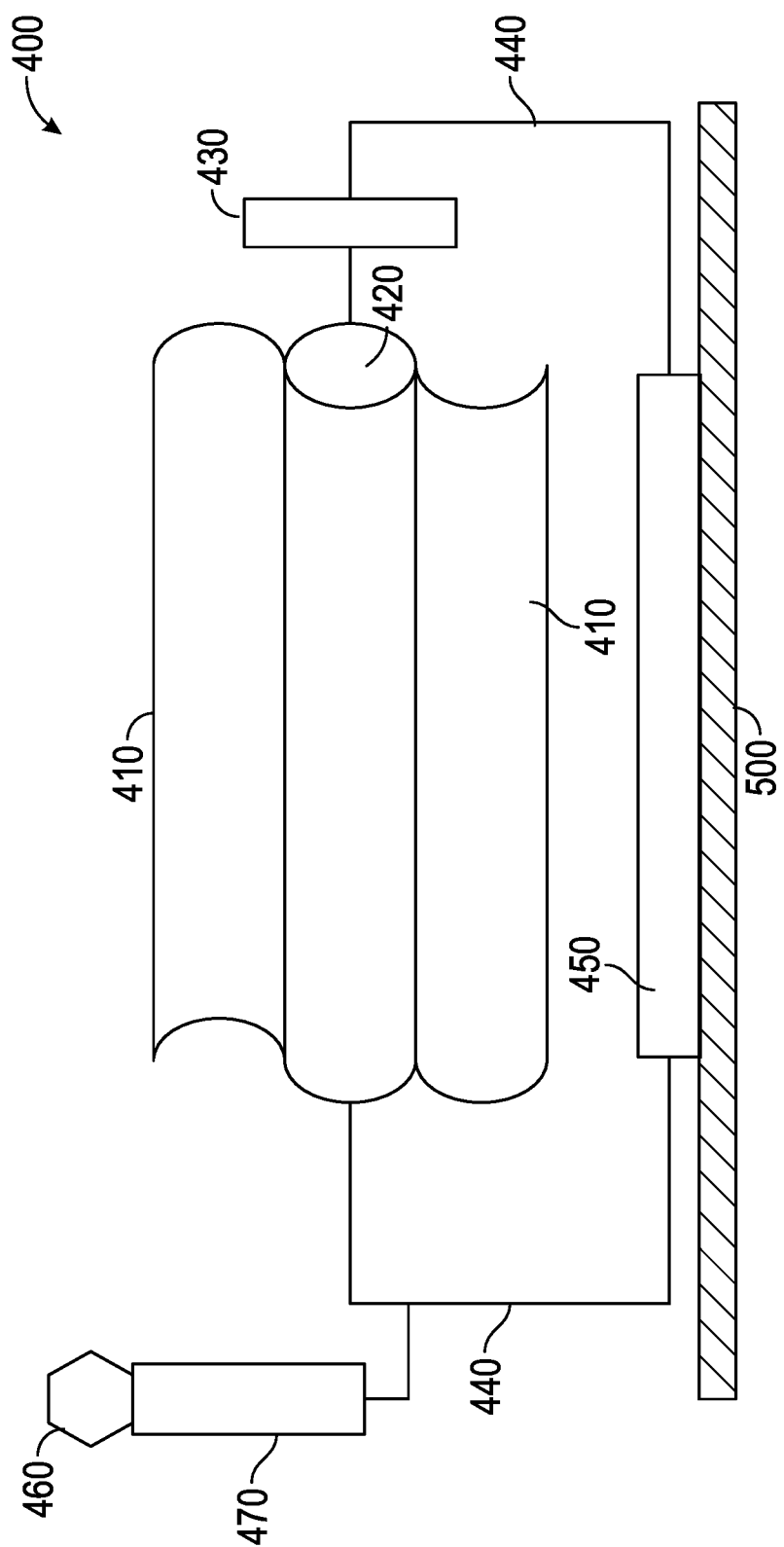
FIG. 9 shows a perspective view of the vertical-axis wind turbine according to an alternative embodiment.

FIG. 9 shows a perspective view of the VAWT (400) according to an alternative embodiment. The alternative embodiment further comprises an orientation mechanism (450) coupled to the VAWT wherein the orientation mechanism is configured to rotate a plurality of blades (410) and a rotor (420) coupled thereto such that the VAWT is facing an optimal direction with direction of wind. A wind sensor (460) may be coupled to the VAWT for measuring wind direction and subsequently send communication to a control module (470). The control module is configured to, based on data received from the wind sensor, activate the orientation mechanism to make appropriate adjustments. The control module may further be electrically coupled to the generator. In such a configuration, the control module can continuously measure power generated and calculate when power from being in a sub-optimal orientation is low enough where power expended to rotate the VAWT is justified.

Figure 10:
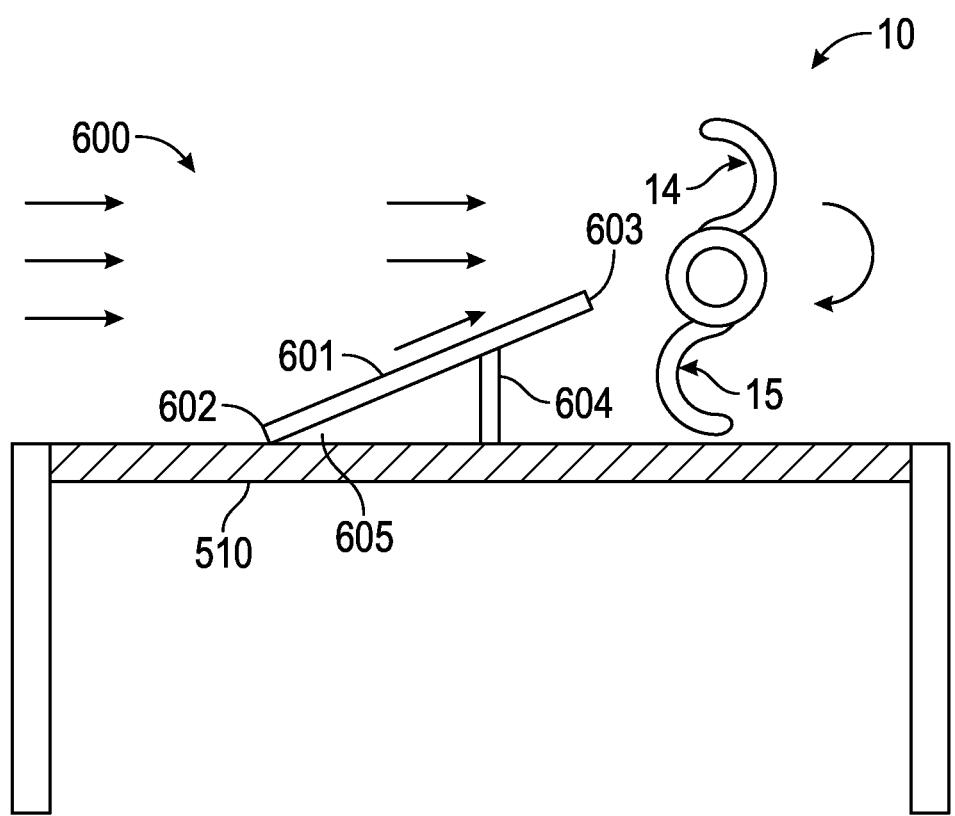
FIG. 10 shows a side view of wind turbine system with wind director in accordance with a seventh illustrated embodiment.

FIG. 10 shows a wind turbine (10) system with a first wind director (600) according to a seventh illustrated embodiment. The first wind director is coupled to a first mounting surface (510) and comprises a first slanted portion (601) having a first end (602) and a second end (603). A first support element (604) is coupled to both the first mounting surface and the first slanted portion at the second end. The first support element raises the first slanted portion relative to the first mounting surface such that the second end is at a further distance from the first mounting surface than the first end. A first angle (605) is formed between the first mounting surface and the first slanted portion at the first end.

The first wind director (600) is configured to direct air that would otherwise apply a drag force on a returning blade (15) to instead apply an even greater force to an advancing blade (14). Height of the support element is sufficiently long enough to ensure that portions of the wind turbine (10) besides the advancing blade are blocked from the wind. The wind turbine may be coupled to the first mounting surface (510), the first wind director, or other surfaces.

Figure 11:
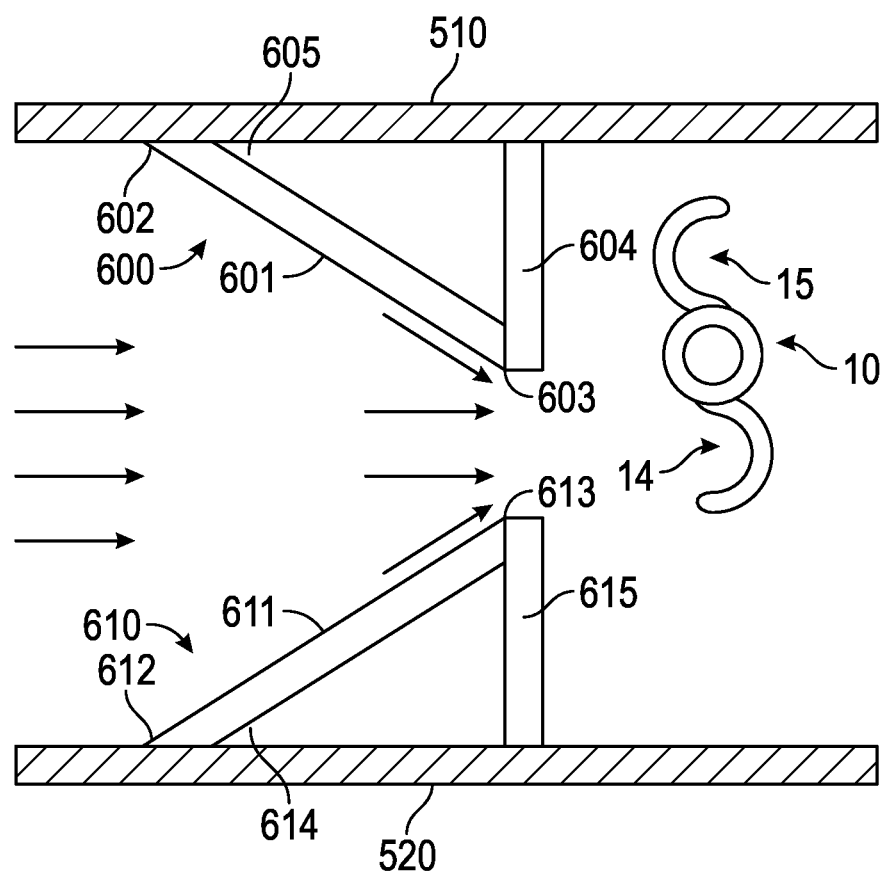
FIG. 11 shows a side view of a wind turbine system with two wind directors in accordance with an eight illustrated embodiment.

FIG. 11 shows a side view of a wind turbine (10) system having first wind director (600) and a second wind director (610) according to an either illustrated embodiment. The first wind director is mounted to a first mounting surface (510) and the second wind director is coupled to a second mounting surface (520) such that the first and second mounting surfaces are characterized as being in a parallel formation. The first wind director comprises a first slanted portion (601) having a first end (602) and a second end (603). A first support element (604) is coupled to the second end and the first mounting surface. A first angle (605) is formed between the first end and the first mounting surface. The first wind director is configured to reduce drag force on a returning blade (15) of the wind turbine and furthermore, to apply additional force to an advancing blade (14).

The second wind director (610) comprises a similar structure as that of the first wind director (600), as can be characterized as being in a mirror formation relative to the first wind director. The second wind director comprises a second slanted portion (611) having a third end (612) and a fourth end (613). A second support element (615) is coupled to the fourth end and the second mounting surface (520). A second angle (614) is formed between the third end and the second mounting surface. The second wind director is configured to apply an additional force to the advancing blade (14).

In some embodiments, the first wind director (600) and second wind director (610) are positioned such that the first support element (604) and the second support element (615) are characterized as being in a colinear formation. A gap between the first and second support element exists to allow wind to pass through, and is generally equal to or less than a blade length of the advancing blade (14).

The first and/or second mounting surfaces may comprise a roof or sidewall of a building, or other structures sufficient to hold a wind turbine and wind director that can be appreciated by one having skill in the art.

The wind directors as shown and described can be made of lightweight yet durable materials such as aluminum, thermoplastics, or other materials that can be appreciated by one having skill in the art.

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

FEATURE LIST wind turbine (10)
rotor (11)
tower base (12)
plurality of blades (13)
advancing blade (14)
returning blade (15)
blade length (16)
blade height (17)
rotor diameter (18)
rotation diameter (19)
direction of wind (20)
drag force (21)
wind director (100)
top portion (101)
top periphery (102)
bottom portion (103)
hollow interior (104)
first side (105)
second side (106)
slanted portion (107)
proximal end (108)
distal end (109)
inlet (110)
inlet width (111)
inlet height (112)
outlet (120)
outlet width (121)
outlet height (122)
catcher (130)
wind shadow (140)
wind shadow blocker (150)
orientation mechanism (200)
active yaw mechanism (210)
wind sensor (215)
passive yaw mechanism (220)
wind vane (225)
coupler (230)
support structure (240)
secondary duct (300)
duct length (310)
terminal end (315)
angled outlet (320)
duct angle (325)
duct slant (330)
duct inlet (340)
vertical-axis wind turbine (400)
plurality of blades (410)
rotor (420)
generator (430)
mount (440)
orientation mechanism (450)
wind sensor (460)
control module (470)
mounting surface (500)
first mounting surface (510)
second mounting surface (520)
first wind director (600)
first slanted portion (601)
first end (602)
second end (603)
first support element (604)
first angle (605)
second wind director (610)
second slanted portion (611)
third end (612)
fourth end (613)
second angle (614)
second support element (615)

What is claimed:

1. A wind turbine system coupled to both a first building and a second building, the first and second buildings each fastened to a ground surface, the system comprising:
a turbine having a rotor perpendicular to both the ground surface and a direction of wind, the rotor comprising a plurality of blades including an advancing blade and a returning blade;
a first wind director connected to the first building at a first sidewall of the first building wherein the first sidewall is an exterior surface of the first building, the first wind director configured to block wind from the returning blade and direct wind toward the advancing blade;
a second wind director connected to the second building at a second sidewall of the second building wherein the second sidewall is an exterior surface of the second building, the second wind director comprises a mirror formation of the first wind director along a plane parallel to either the first sidewall or the second sidewall; and a gap formed between the first wind director and the second wind director, the gap comprising a gap direction extending from the first wind director to the second wind director wherein the gap direction extends parallel to the ground surface;

wherein the first sidewall and the second sidewall are characterized as being in a parallel formation; and further wherein the first building is separate and distinct from the second building.

2. The wind turbine system of claim 1, wherein the gap comprises a length equal to or less than a blade length of the advancing blade.

3. The wind turbine system of claim 1, the system further comprising a distance between the first sidewall and the second sidewall wherein the distance comprises a portion of the first wind director, a portion of the second wind director, and the gap disposed therebetween.

4. The wind turbine system of claim 1, the turbine further comprising one or more mounts coupled to the rotor, the one or more mounts further coupled to the first sidewall.

5. The wind turbine system of claim 1, the first wind director further comprising:

a first slanted portion having a first end and a second end opposite the first end;

a first support element coupled to the second end and further coupled to the first sidewall; and a first angle formed by the first end of the first slanted portion and the first sidewall.

6. The wind turbine system of claim 5, the second wind director further comprising:

a second slanted portion with a third end and a fourth end opposite the third end;

a second support element coupled to the fourth end and further coupled to the second sidewall; and a second angle formed by the third end of the second slanted portion and the second sidewall;

wherein the second wind director is configured to direct wind toward the advancing blade.

7. The wind turbine system of claim 6, wherein the first support element and second the second support element comprise a colinear alignment.

* * * * *